United States Patent
Osowski

[19]

[11] Patent Number: 5,820,145
[45] Date of Patent: Oct. 13, 1998

[54] CART FOR TRANSPORTING TABLES, SHEET MATERIAL AND THE LIKE OF VARIOUS SIZES

[76] Inventor: Paul Osowski, 505 N. Peach Ave., Marshfield, Wis. 54449

[21] Appl. No.: 659,950

[22] Filed: Jun. 7, 1996

[51] Int. Cl.⁶ .................................................. B60G 7/00
[52] U.S. Cl. ........................................ 280/79.7; 280/47.19
[58] Field of Search ............................. 280/79.7, 47.131, 280/47.17, 47.19, 47.26; 294/15; 414/11; 410/34, 43; 24/522, 528

[56] References Cited

U.S. PATENT DOCUMENTS

| | | | |
|---|---|---|---|
| 2,291,474 | 7/1942 | Kalmback | 280/61 |
| 2,774,607 | 12/1956 | Palmer | 280/47.3 |
| 2,816,771 | 12/1957 | Hunt | 280/47.13 |
| 4,278,244 | 7/1981 | Carter | 267/17 |
| 4,488,733 | 12/1984 | Hellsten | 280/47.16 |
| 4,630,838 | 12/1986 | Stockton | 280/47.17 |
| 4,753,445 | 6/1988 | Ferrare | 280/47.13 |
| 5,284,410 | 2/1994 | Spector | 414/11 |

*Primary Examiner*—Robert J. Oberleitner
*Assistant Examiner*—C. T. Bartz

[57] ABSTRACT

A cart for transporting doors, tables, plywood and other sheet material of various sizes consisting of: an axle with two wheels journalled on opposite ends of an axle. A V-channel is anchored to the axle perpendicular to it, into which the center of the long side of a table or sheathing is inserted and leaned against an upright standard which is anchored to the axle perpendicular to the axle and the V-channel. The loaded material is then held in an upright position against the upright standard by a retaining hook that slides freely up and down the upright standard resting on the top edge of the loaded material and hooking over it. The combination of V-channel, upright standard, and retaining hook allows the the cart to adjust to a wide range of different size material without the need of modification. Because the wheels are in the center of the load, the whole unit consisting of cart and loaded material is easily maneuvered and is very stable.

1 Claim, 1 Drawing Sheet

CART FOR TRANSPORTING TABLES, SHEET MATERIAL AND THE LIKE OF VARIOUS SIZES

BACKGROUND—FIELD OF INVENTION

The present invention relates generally to hand carts and/or transport carts and is more particularly adapted for the transporting of folding tables with legs folded, doors, and other types of sheet stock of various sizes and the like, by providing the supporting and retaining structure that will allow the cart to be easily loaded and maneuvered by one person.

BACKGROUND—DESCRIPTION OF PRIOR ART

Most institutions such as schools, churches, hotels etc. on a regular basis may need to move tables, plywood or other sheet material of various sizes from one location to another. If they don't need to move several items, they usually resort to carrying them by hand one at a time because there are no products on the market that will perform this function.

Several devices for carrying sheet material have been proposed which do not provide the novel improvements of the invention herein disclosed. For example the U.S. Pat. No. 5,284,410 of Sare/Spector, U.S. Pat. No. 2,816,771 of E. R. Hunt, and U.S. Pat. No. 4,630,838 of Stockton, all serve the same general use of hauling sheet material but do not have the capability to adapt to material of different sizes. They are awkward and clumsy to use, requiring the user to balance the cart and material when maneuvering it, which is especially difficult when turning corners or trying to open doors. Stockton, Hunt, and Sare/Spector all have the added disadvantage of not being free-standing. They all need to be leaned against some supporting structure when loaded and left unattended.

U.S. Pat. No. 2,291,474 of Kalmbach is very limited in its use in that it is designed to be clamped onto material of a specific size and requires the use of two units, each clamped to opposite ends of the material to be hauled, which is a very time consuming and awkward process.

U.S. Pat. No. 4,753,445 of Ferrare is very specialized in its use also. Ferrare will not carry any type of sheet material since it is designed to carry only cylinders.

All of these problems are solved by this present invention which, because it is free-standing, does not need to be balanced when transporting a load or leaned against a wall or other supporting structure when unattended. It is also very stable when turning corners or going through doorways.

Because of the combination of V-channel, upright standard, and retaining hook, this present invention also can carry a wide range of different size material from doors to tables to plywood without modifications, easily adjusting to different size material.

SUMMARY OF INVENTION

It is the primary object of the present inventor to provide a cart for transporting tables or other sheet material that will overcome the aforementioned disadvantages.

Another object is to provide a cart for carrying tables or other sheet material on its edge so that it is easily loaded and transported by one person through doorways and around corners, remaining stable while being controlled with only one hand.

An additional object is to provide a cart for transporting tables or other sheet material with a retaining hook that slides up and down an upright standard adjusting to different widths of material and hooking over its top edge, locking it securely onto the cart, making the whole unit consisting of loaded material and cart free-standing.

A further object is to provide a cart for transporting tables or other sheet material with a V-channel into which the long side of a table or other sheet material is inserted which, because of the V-shape, will accept material of different thickness and also act as a stand when the cart is empty, holding the cart in a generally upright position.

A still further object is to provide a cart for transporting tables or other sheet material which is simple to use and easily adjusts in order to accommodate different size loads, such as a 28-inch wide table or 48-inch wide sheet of plywood, and yet it doesn't require considerable strength in order to load and maneuver it.

BRIEF DESCRIPTION OF DRAWINGS FIGURES

DETAILED DESCRIPTION OF THE DRAWING FIGURE

Figure 1:
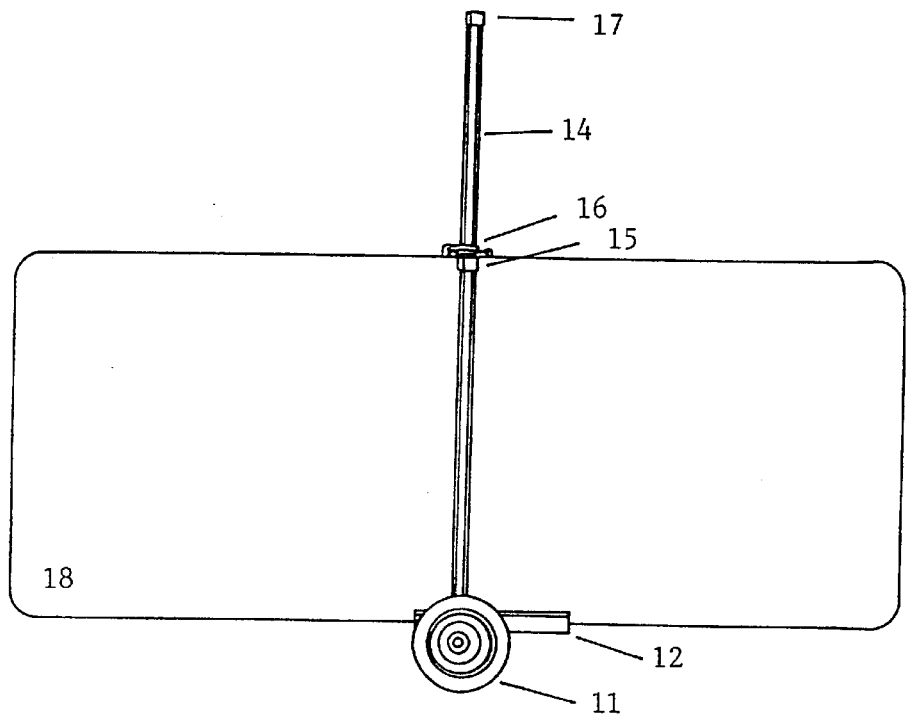
FIG. 1 is a perspective view of the instant invention supporting a table loaded thereon.
Figure 2:
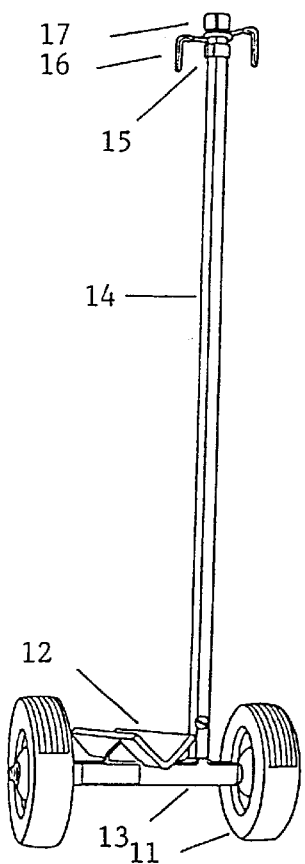
FIG. 2 is another perspective view of the instant invention without a load, showing how the V-channel supports the cart, holding it in a generally upright position when not in use.
Figure 3:
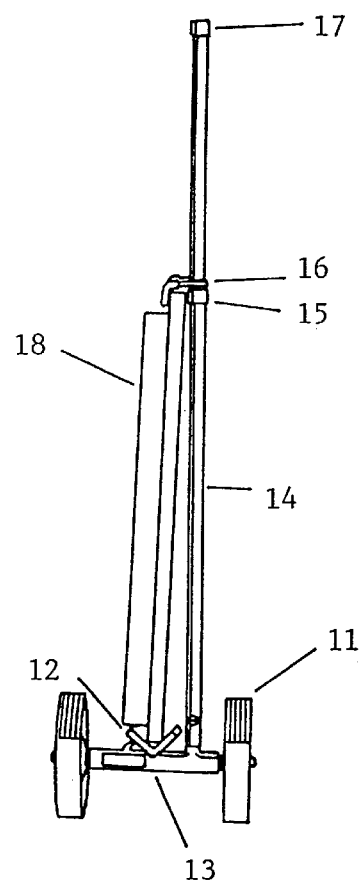
FIG. 3 is an end view of the instant invention with a table loaded.

The figures illustrate a cart for transporting doors, tables (18), plywood and any other such material, which consists of an elongated V-shaped channel(12) anchored to an axle(13) into which the long side of a table(18) or other sheet material is inserted and leaned against an upright standard(14), which is anchored perpendicular to the axle(13) and V-channel(12). A retaining hook(16) encircles the upright standard(14) and can freely move up and down the upright standard(14), with its travel limited by a stop(15) anchored to the upright standard(14) at a distance up from the V-channel(12) which is slightly less than the width of the narrowest material to be hauled, keeping the retaining hook(16) conveniently within reach. The upright travel of the retaining hook(16) is limited by a cap(17) which is slid over the top end of the upright standard(14) in order to keep the retaining hook(16) from sliding off the top end of the upright standard(14) and being misplaced. The table(18) or other sheet material is loaded onto the cart by inserting the long edge of a table(18) or other sheet material into the V-channel(12) and leaning it against the upright standard(14) and sliding the retaining hook(16) along the upright standard(14) until it hooks over the top edge of the table or other sheet material. Once loaded, the whole unit consisting of table(18) or other sheet material is free-standing and is easily maneuvered by grasping an upper corner of the table or other sheet material that is loaded on the cart and pushing or pulling and moving to the right or left in order to maneuver it to the desired location.

Although a particular embodiment of the invention has been described in detail for purposes of illustration, it is to be understood that minor variations may be made in the apparatus by those skilled in the art without departing from the spirit of the invention as defined in the annexed claims.

What is claimed is:

1. A cart for transporting a folding table with legs folded, doors, or other sheet material of various sizes including: plywood, particle board, wallboard, comprising:

a) two wheels journalled to rotate on each end of an axle;
b) means for supporting and carrying material of various thickness in a snug-fitting manner comprising a V-channel perpendicularly oriented across said axle with bottom of said V-channel secured to said axle;
c) an upright standard secured to said axle and extending upward perpendicular to said axle and said V-channel against which material to be loaded is leaned;
d) means for securing loaded material in an upright manner, said means sliding freely up and down said upright standard, adjusting to loaded material of various widths, resting on top of loaded material and hooking over it holding loaded material in an upright position against said upright standard;
e) a stop secured to said upright standard to stop said securing means from sliding to bottom of said upright standard, keeping said securing means conveniently within reach;
f) said means for securing loaded material in an upright manner comprises rigid wire that encircles said upright standard, with each end of said wire projecting out at a tangent perpendicular to said upright standard, and with each end of said wire bent parallel to said upright standard, each end of said wire positioned at a different distance from said upright standard in order to accomodate loaded material of different sizes, said securing hook sliding up and down said upright standard and resting on the top edge of said loaded material and hooking over said loaded material, holding it in an upright position, retaining it against said upright standard;

whereby said cart on a substantially horizontal surface may be placed in a stable upright position of rest, being supported by said wheels as well as one end of said V-channel when unloaded, and being supported by said wheels as well as a lower corner of the loaded material when loaded.

* * * * *